(12) United States Patent
Bowers et al.

(10) Patent No.: US 7,246,903 B2
(45) Date of Patent: *Jul. 24, 2007

(54) TINTED CONTACT LENSES WITH COMBINED LIMBAL RING AND IRIS PATTERNS

(75) Inventors: Jack W. Bowers, Jacksonville, FL (US); Jerry Dukes, Jacksonville, FL (US); Karin D. McCarthy, Ponte Vedra Beach, FL (US); Angie Bowers, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/922,681

(22) Filed: Aug. 19, 2004

(65) Prior Publication Data

US 2006/0050233 A1    Mar. 9, 2006

(51) Int. Cl.
*G02C 7/04* (2006.01)
(52) U.S. Cl. .................... 351/162; 351/160 R
(58) Field of Classification Search ............ 351/160 R, 351/162; D24/172
See application file for complete search history.

(56) References Cited

U.S. PATENT DOCUMENTS

| | | | |
|---|---|---|---|
| 3,454,332 A | 7/1969 | Siegel | |
| 5,160,463 A | 11/1992 | Evans et al. | |
| 5,302,978 A | 4/1994 | Evans et al. | |
| 5,793,466 A | 8/1998 | Mioncada | |
| 5,936,705 A * | 8/1999 | Ocampo et al. | 351/162 |
| 5,963,298 A * | 10/1999 | Bard | 351/162 |
| 6,030,078 A | 2/2000 | Ocampo | |
| 6,132,043 A | 10/2000 | Atkins et al. | |
| 6,513,930 B2 | 2/2003 | Hsu | |
| 6,733,126 B2 | 5/2004 | Streibig | |
| 6,827,440 B2 * | 12/2004 | Ocampo | 351/162 |
| 2003/0025873 A1 | 2/2003 | Ocampo | |
| 2004/0119939 A1 * | 6/2004 | Clark et al. | 351/162 |
| 2005/0001978 A1 * | 1/2005 | Ocampo | 351/162 |
| 2005/0254002 A1 * | 11/2005 | Dukes et al. | 351/160 R |

FOREIGN PATENT DOCUMENTS

| | | |
|---|---|---|
| EP | 498835 B1 | 8/1992 |
| EP | 0982 617 | 1/2000 |
| KR | 300285151 | 11/2001 |
| KR | 300287745 | 12/2001 |
| WO | WO 91/06886 | 5/1991 |
| WO | WO 99/46630 | 9/1999 |
| WO | 00141591 | 3/2000 |

OTHER PUBLICATIONS

Frank Weinstock, "Contact Lens Fitting; A Clinical Text Atlas", p. 8.21, J.B. Lippincott, USA, 1989.
PCT International Search Report, dated Nov. 18, 2005, for PCT Int'l. Appln. No. PCT/US2005/029373.

* cited by examiner

*Primary Examiner*—Scott J. Sugarman
*Assistant Examiner*—Darryl J. Collins
(74) *Attorney, Agent, or Firm*—Lois Gianneschi

(57) ABSTRACT

The invention provides tinted contact lenses that include a limbal ring that serves to enhance the definition of the wearer's iris resulting in the iris appearing larger to viewer's of the lens wearer. The lens also incorporates a plurality of tapered spokes that overlie a portion or all of the of the wearer's iris. The lenses of the invention may be used as cosmetic lenses for enhancing or altering an individual's iris.

18 Claims, 2 Drawing Sheets

TINTED CONTACT LENSES WITH COMBINED LIMBAL RING AND IRIS PATTERNS

FIELD OF THE INVENTION

The invention relates to tinted contact lenses. In particular, the invention provides contact lenses that either enhance or change the color of a lens wearer's iris.

BACKGROUND OF THE INVENTION

The use of tinted, or colored, contact lenses to either or both alter the natural color of the iris and to mask ophthalmic abnormalities is well known. Typically, these lenses use either or both opaque and translucent colors to change the color of an iris, as for example, from brown to blue. Additionally, tinted lenses have been manufactured that attempt to enhance the color of a dark-eyed person without changing the color of the iris. These lenses are disadvantageous because either the color enhancement is too subtle to be noticed when the lens is on-eye or the enhancement lends an unnatural appearance to the wearer's iris.

DETAILED DESCRIPTION OF THE INVENTION AND PREFERRED EMBODIMENTS

The invention provides tinted contact lenses, and methods for their manufacture, that enhance the lens wearer's iris. The lenses of the invention have a pattern that includes a limbal ring that serves to enhance the definition of the wearer's iris resulting in the iris appearing larger to viewer's of the lens wearer. Additionally, the lenses of the invention have additional pattern elements that completely or, preferably, partially overlie the wearer's iris. The lenses of the invention may find greatest utility as cosmetic lenses for enhancing a dark-eyed individual's iris, but also may be used to enhance the iris of a light-eyed lens wearer as well.

In one embodiment, the invention provides a contact lens comprising, consisting essentially of, and consisting of a limbal ring and a plurality of tapered spokes.

By "limbal ring" is meant an annular band of color that, when the lens is on-eye and centered, partially or substantially completely overlies the lens wearer's limbal region, or the junction of the sclera with the cornea. Preferably, the limbal ring substantially completely overlies the limbal region. The innermost border, or edge closest to the geometric center of the lens, of the limbal ring may form a circle having a diameter of about 8 mm to about 12 mm, preferably about 9 to about 11 mm, the circle being centered at the lens' geometric center. The ring may be of any suitable width and preferably is about 0.5 to about 2.5 mm in width, more preferably about 0.75 to about 1.25 mm in width.

Extending inwardly from the innermost border of the limbal ring toward the geometric center of the lens are substantially triangular-shaped structures that resemble spokes in a wheel. The tapered spokes may, but preferably do not, extend over the entire iris portion of the lens, meaning the portion of the lens that overlies the iris when the lens is on-eye and centered. Rather, preferably the spokes extend inwardly from the innermost edge of the limbal ring so that the innermost edge of the spoke pattern is located at about 6.5 mm or more, more preferably about 7 mm or more from the geometric center of the lens. The spokes may be of uniform or varying shapes and sizes and preferably are about 1 to about 2 mm in length.

Figure 1:
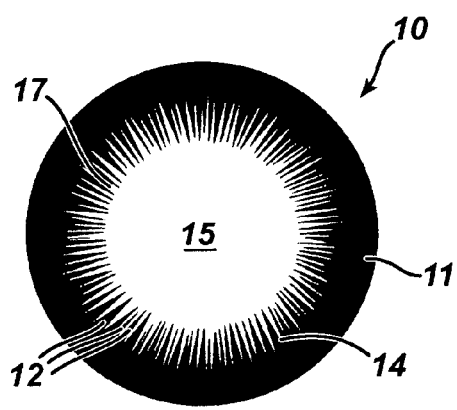
FIG. 1 is one embodiment of the invention.

In FIG. 1 is shown one embodiment of the limbal ring-tapered spoke pattern 10. In this embodiment, limbal ring 11 is a black opaque band that is approximately 1 mm in width. Beginning at the innermost border 16 of limbal ring 11 and extending inwardly towards the geometric center of the lens are a plurality of randomly arranged tapered spokes 12, the innermost border 14 of which forms a circle with a diameter of 7 mm from centered at the geometric center of the lens. Although all of the spokes are generally similarly configured, preferably no one of the spokes is exactly the same as another of the spokes. The spokes are interspersed, or bordered, by spaces 17 in which spaces there are no elements. Spaces 17 are also generally all similarly configured, but preferably no one of the spaces is of the exact same configuration as any of the other of the spaces or spokes. Area 15 is a region in which there are no pattern elements, which area as shown, will partially compose the iris portion as well as the whole of the pupil portion, or portion of the lens that overlies the wearer's pupil while the lens is on-eye and centered. As shown, area 15 is clear, but it may be translucently or opaquely colored as well. Innermost border 16 as shown is of an even, regular shape, but may be an uneven, irregular border. Similarly, although tapered spoke border 14 forms a substantially even border, it may form an uneven border.

Figure 2:
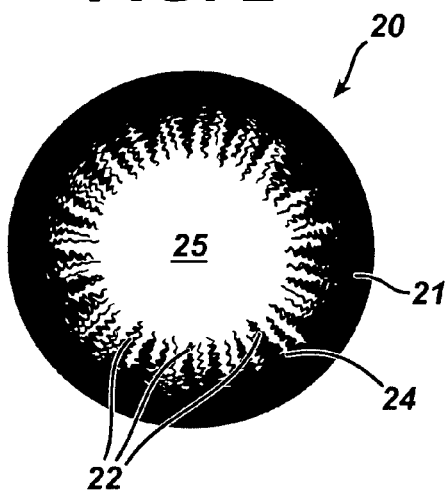
FIG. 2 is a second embodiment of the invention.

In FIG. 2 is shown an alternative tapered spoke pattern 20. In this embodiment, beginning at the innermost border 24 of limbal ring 21 and extending inwardly towards the geometric center of the lens is a plurality of randomly arranged tapered spokes 22. Tapered spokes 22 are composed of one or more wavy lines that taper as one moves toward the lens' geometric center. Innermost limbal ring border 24, as shown, is of an uneven, irregular shape. Area 25 is a region in which there are no pattern elements, which area will partially compose the iris portion as well as the pupil portion.

Figure 3:
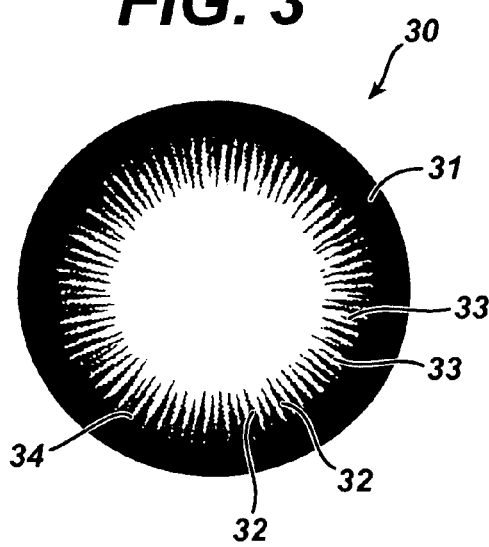
FIG. 3 is a third embodiment of the invention.

In FIG. 3 is shown yet another tapered spoke pattern 30. In this embodiment, beginning at the innermost border 34 of limbal ring 31 and extending inwardly to the lens' center are a plurality of spokes 32 and 33, spokes 32 being longer than spokes 33 and both of which spokes are formed by wavy lines. As shown, spokes 32 and 33 are spaced at substantially regular intervals from one another, but may be irregularly spaced as well. Additionally, each of spokes 32 are all of the substantially same shape, but they may be of differing shapes as may be the case for spokes 33.

Figure 4:
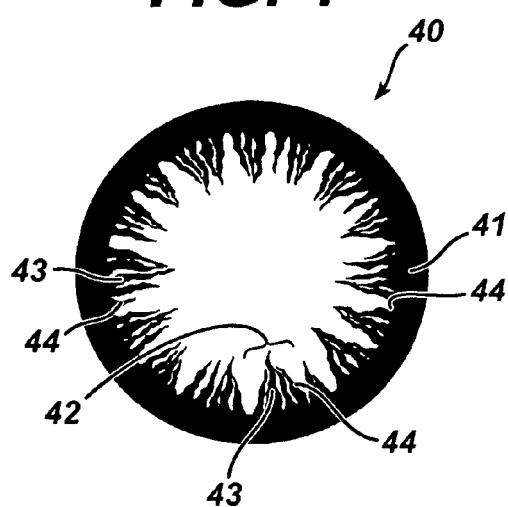
FIG. 4 is a fourth embodiment of the invention.
Figure 5:
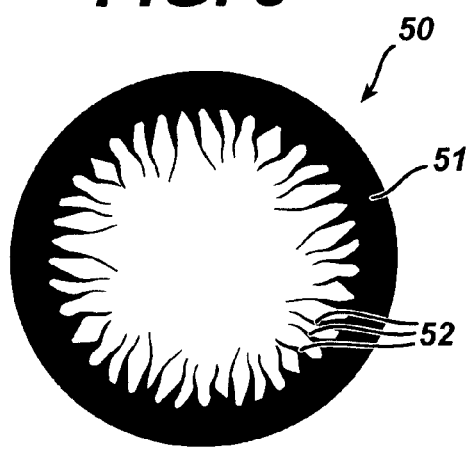
FIG. 5 is a fifth embodiment of the invention.

In FIG. 4 is shown still another tapered spoke pattern 40, which is a variation of the pattern of FIG. 3. In this embodiment, the spoke pattern has multiple spokes 43 and 44, spokes 43 being longer than spokes 44, and both of which spokes are formed by wavy lines. As shown, spokes 43 and 44 are randomly grouped together to form clusters 42. In FIG. 5 is shown tapered spoke pattern 50 in which there is a limbal ring 51 and extending inwardly therefrom are a plurality of randomly spaced spokes 52. In this embodiment, spokes 52 are bent at one or more locations.

In all of the patterns of the invention the spokes may extend inwardly to the geometric center of the lens. Preferably, however, the innermost border of the spokes, or edge relative to the geometric center of the lens, is located at about 6.5 mm or greater, preferably about 7 mm or greater from the geometric center of the lens.

Figure 6:
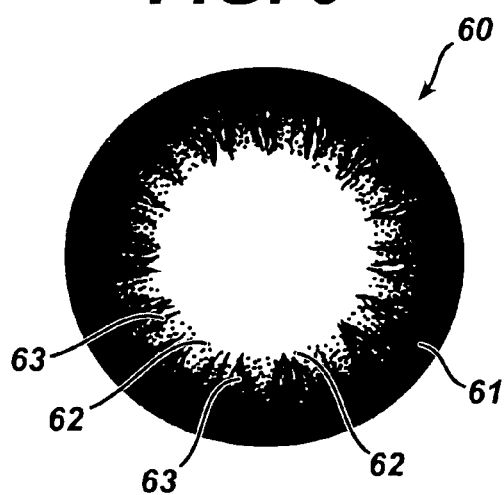
FIG. 6 is a sixth embodiment of the invention.

In addition to the spokes and limbal ring elements, the patterns of the invention may include any of a number of additional components. Such components may include, without limitation, geometric structures, such as dots and lines, or fanciful structures including, without limitation, striae, feather-like shapes, and the like, and combinations thereof. In a preferred embodiment as shown in FIG. 6, a plurality of random dots 62 overlay the spokes 63 and the spaces between spokes 63. Alternatively, the plurality of dots may overlay only a portion of the area of the spokes and spaces therebetween, such as overlaying only their innermost portions or portions closest to limbal ring 61 or about 1 to about 90%, preferably about 25 to 75%, of that area. As yet another alternative, the random dot pattern may be such that, as one moves inwardly toward the lens' geometric center, the dots become less numerous forming a dot density gradient. The dots aid in blending of the border between limbal ring 61 and the spokes 63.

Figure 7:
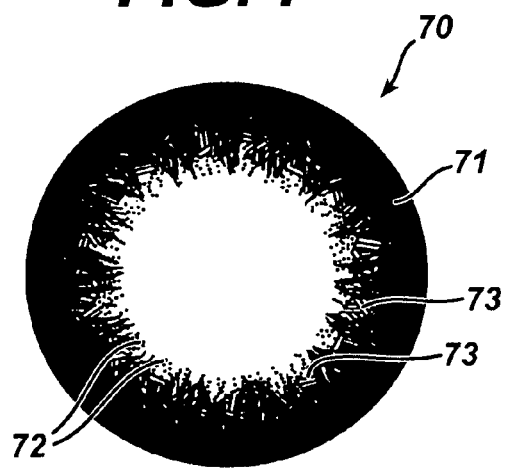
FIG. 7 is a seventh embodiment of the invention.

As yet another alternative, in FIG. 7 is shown a plurality of random dots 72 and lines 71 overlaying spokes 73 and the spaces between spokes 73. The dots 72 overlay the entirety of spokes 73 and the spaces therebetween. Lines 71 are arranged in a hatch-like distribution, meaning that the lines are in groups of two or more parallel lines, and overlay only a portion of the spokes and spaces therebetween. The dots used in the patterns of the invention may be of any size and preferably are about 0.060 to about 0.180 mm in diameter, more preferably about 0.0075 to about 0.0125 mm in diameter.

In any of the patterns of the invention, the pupil portion preferably is clear. However, the pupil portion may be an area of translucent or opaque color or any combination of opaque and translucent colors.

As used in a lens for either enhancing or altering the wearer's eye color, preferably the limbal ring element is a solid band of color that masks the color of the lens wearer's limbal region and more preferably the masking color is an opaque color. The remaining elements, the spokes, dots and other pattern elements, may be translucent or opaque depending on the desired on-eye result. For purposes of the invention, by "translucent" is meant a color that permits an average light transmittance (% T) in the 380 to 780 nm range of about 60 to about 99%, preferably about 65 to about 85% T. By "opaque" is meant a color that permits an average light transmittance (% T) in the 380 to 780 nm range of 0 to about 55, preferably 7 to about 50% T.

Figure 8:
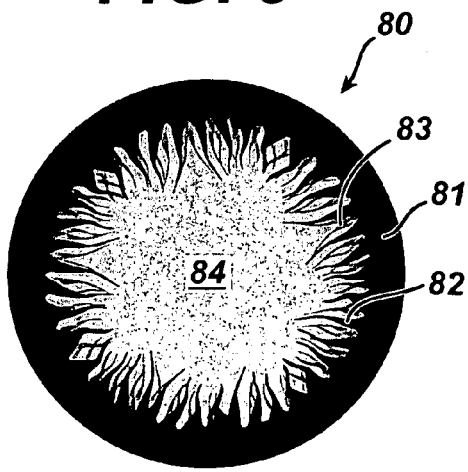
FIG. 8 is an eighth embodiment of the invention.

The color of the limbal ring, spokes and other pattern elements may be substantially the same as, or complementary to, each other. For example, in FIG. 8 is shown pattern 80 in which limbal ring 81 and spokes 82 are of the same color. Spokes 83 are of a different, but complementary color to that of limbal ring 81 and spokes 82. Pupil portion 84 is of yet another color complementary to the limbal ring and spoke colors. Preferably, all elements of the pattern are of the same color and the pupil portion is clear, meaning that it is colorless.

The color selected for each of the limbal ring and remaining pattern elements will be determined by the natural color of the lens wearer's iris and the enhancement or color change desired. Thus, elements may be any color including, without limitation, any of a variety of hues and chromas of blue, green, gray, brown, black yellow, red, or combinations thereof. Preferred colors for the limbal ring include, without limitation, any of the various hues and chromas of black, brown and gray.

The elements, may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include, without limitation, pthalocyanine blue, pthalocyanine green, carbazole violet, vat orange # 1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

The dye or pigment selected may be combined with one or more of a pre-polymer, or binding polymer, and a solvent to form the colorant used to produce the translucent and opaque layers used in the lenses of the invention. Other additives useful in contact lens colorants also may be used. The binding polymers, solvents, and other additives useful in the color layers of the invention are known and either commercially available or methods for their making are known.

The elements may be applied to, or printed on, one or more surfaces of a lens or may be printed onto one or more surfaces of a mold into which a lens forming material will be deposited and cured. In a preferred method for forming lenses incorporating the designs of the invention, a thermoplastic optical mold, made from any suitable material including, without limitation, cyclic polyolefins and polyolefins such as polypropylene or polystyrene resin is used. The elements are deposited onto the desired portion of the molding surface of the mold. By "molding surface" is meant the surface of a mold or mold half used to form a surface of a lens. Preferably, the deposition is carried out by pad printing as follows.

A metal plate, preferably made from steel and more preferably from stainless steel, is covered with a photo resist material that is capable of becoming water insoluble once cured. The elements are selected or designed and then reduced to the desired size using any of a number of techniques such as photographic techniques, placed over the metal plate, and the photo resist material is cured.

The plate is subsequently washed with an aqueous solution and the resulting image is etched into the plate to a suitable depth, for example about 20 microns. A colorant containing a binding polymer, solvent, and pigment or dye is then deposited onto the elements to fill the depressions with colorant. A silicon pad of a geometry suitable for use in printing on the surface and varying hardness, generally about 1 to about 10, is pressed against the image on the plate to remove the colorant and the colorant is then dried slightly by evaporation of the solvent. The pad is then pressed against the molding surface of an optical mold. The mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear, pre-polymer layer is used, which pre-polymer layer overlays at least the limbal ring and dot patterns and preferably forms the entirety of the lens' outermost surface. The pre-polymer may be any polymer that is capable of dispersing the pigment and any opacifying agent used.

The invention may be used to provide tinted hard or soft contact lenses made of any known lens-forming material, or material suitable for manufacturing such lenses. Preferably, the lenses of the invention are soft contact lenses, the material selected for forming the lenses being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens is made from a material containing a siloxane functionality, including, without limitation, polydimethyl siloxane macromers, methacryloxypropyl polyalkyl siloxanes, and mixtures thereof, a silicone hydrogel or a hydrogel made of monomers containing hydroxy groups, carboxyl groups, or both and combinations thereof Materials for making soft contact lenses are well known and commercially available. Preferably, the lens material is acquafilcon, etafilcon, genfilcon, lenefilcon, balafilcon, lotrafilcon, or galyfilcon.

What is claimed is:

1. A contact lens, comprising a limbal ring comprising an annular band of color having an inner and an outer border and a plurality of tapered spokes extending inwardly towards the lens' center from the inner border of the limbal ring, each of the tapered spokes comprising a solid, substantially triangular-shaped structure.

2. The lens of claim 1, wherein the spokes are bent.

3. The lens of claim 2, wherein the spokes further comprise spokes of at least two different lengths.

4. The lens of claim 2, further comprising one or more clusters of spokes.

5. The lens of claim 2, further comprising dots, lines, fanciful structures or combinations thereof overlying at least a portion of the limbal ring, at least a portion of the spokes, or both.

6. The lens of claim 2, further comprising dots overlying at least a portion of the limbal ring, at least a portion of the spokes, or both.

7. The lens of claim 6, wherein the dots form a random dot pattern having a dot density gradient.

8. The lens of claim 2, further comprising a plurality of lines comprising a hatch-like pattern overlying at least a portion of the limbal ring, at least a portion of the spokes, or both.

9. The lens of claim 1, wherein the spokes further comprise spokes of at least two different lengths.

10. The lens of claim 1, further comprising one or more clusters of spokes.

11. The lens of claim 1, further comprising dots, lines, fanciful structures or combinations thereof overlying at least a portion of the limbal ring, at least a portion of the spokes, or both.

12. The lens of claim 1, further comprising dots overlying at least a portion of the limbal ring, at least a portion of the spokes, or both.

13. The lens of claim 12, wherein the dots form a random dot pattern having a dot density gradient.

14. The lens of claim 1, further comprising a plurality of lines comprising a hatch-like pattern overlying at least a portion of the limbal ring, at least a portion of the spokes, or both.

15. A contact lens, comprising a limbal ring comprising an annular band of color and having an inner and an outer border and a plurality of tapered spokes extending inwardly towards the lens' center from the inner border of the limbal ring wherein an innermost border of the spokes is located about 6.5 mm or more from the lens' geometric center.

16. The lens of claim 15, wherein each spoke comprises one or more wavy lines.

17. The lens of claim 15, wherein the spokes are bent.

18. A method of enhancing an iris, comprising providing a contact lens comprising a limbal ring comprising and annular band of color and having an inner and an outer border and a plurality of tapered spokes extending inwardly towards the lens' center from the inner border of the limbal ring, each of the tapered spokes comprising a solid, substantially triangular-shaped structure.

* * * * *